Dec. 22, 1936.  F. C. HUTCHISON  2,065,467
WELDING PROCESS AND APPARATUS
Filed May 16, 1933    2 Sheets—Sheet 1
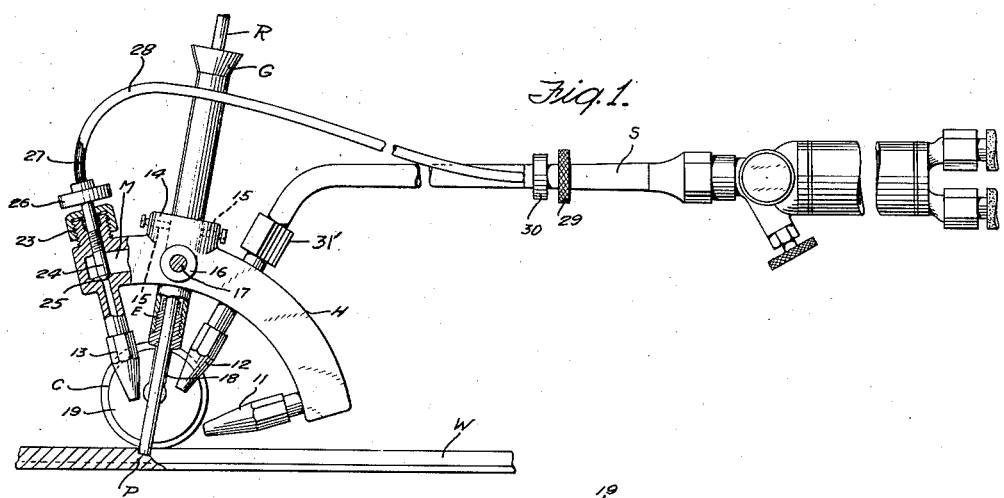
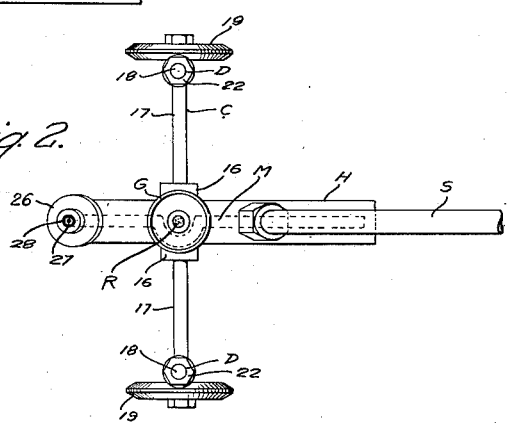
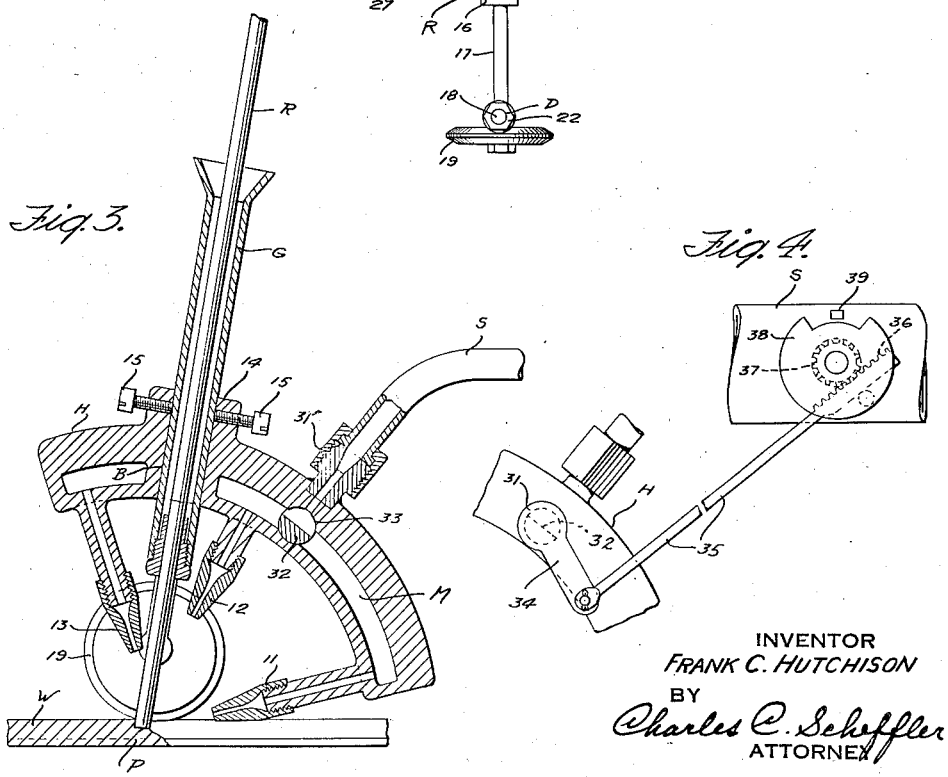
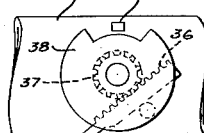
INVENTOR
FRANK C. HUTCHISON
BY
Charles C. Scheffler
ATTORNEY INVENTOR
FRANK C. HUTCHISON
BY
Charles C. Scheffler
ATTORNEY Patented Dec. 22, 1936

2,065,467

UNITED STATES PATENT OFFICE 2,065,467

WELDING PROCESS AND APPARATUS

Frank C. Hutchison, Kansas City, Mo., assignor, by mesne assignments, to Union Carbide and Carbon Corporation, a corporation of New York Application May 16, 1933, Serial No. 671,359

37 Claims. (Cl. 113—59)

This invention relates to a welding process and to an apparatus for performing the same. More particularly this invention pertains to an improved manual welding process and apparatus therefor which are capable of increasing the speed of uniting contiguous edges of metallic members by means of high temperature oxy-acetylene flames and which make unnecessary the use of liners or reinforcing shields behind the weld V.

Heretofore autogenous welding, especially in uniting pipe members at transverse joints, has been performed by manually operated apparatus having a carriage for guiding a blowpipe head and a welding rod guide along the edges of the work. It has been the practice with prior apparatus to direct a welding flame from the blowpipe head at a substantial angle to the surface of the work and to preheat the welding rod only on the forward side or on the side most distant from the completed weld. With the prior type of apparatus it has been customary to rock the blowpipe slightly about an axis behind the welding point and to deposit metal from the rod only as the contiguous edges of the base metal were prepared, the position and movement of the welding flame making it advisable to use a liner to prevent molten metal from running through the weld V. In the use of such apparatus the metal also tends to run ahead onto the cold or unprepared portion of the V which lowers the quality of the weld.

An object of this invention is therefore to provide an improved process for increasing the speed of welding and for making more uniform welds between the edges of metallic members.

Another object of this invention is to provide a process for welding the contiguous edges of metal so that the necessity for liners or shields for backing up the weld V is eliminated.

A further object of this invention is to provide an improved apparatus for increasing the speed of manual welding and for welding various sizes of pipe and thicknesses of metal without adjustment of the apparatus.

Still another object of this invention is to provide an improved welding apparatus for preheating the weld rod substantially uniformly on all sides and also for independently controlling the amount of preheat applied to the rod.

Still another object is to provide in a welding apparatus means for reciprocally controlling the degree of heat from the welding and rod preheating flames.

The above objects and others together with the novel features of this invention will be evident from the following description and the accompanying drawings, of which Fig. 1 is a side elevation of a preferred embodiment of this invention showing the welding apparatus with one support removed in order to disclose the head and tips and a section cut away to show the valve controlling the assisting tip;

Fig. 2 is a plan view of the welding head and carriage, showing the gas passage in outline.

Fig. 3 is a cross-sectional view of an alternative form of this invention showing a three-way valve between the head of the apparatus and the stem;

Fig. 4 shows a controlling device for the three-way valve; and

Figure 5:
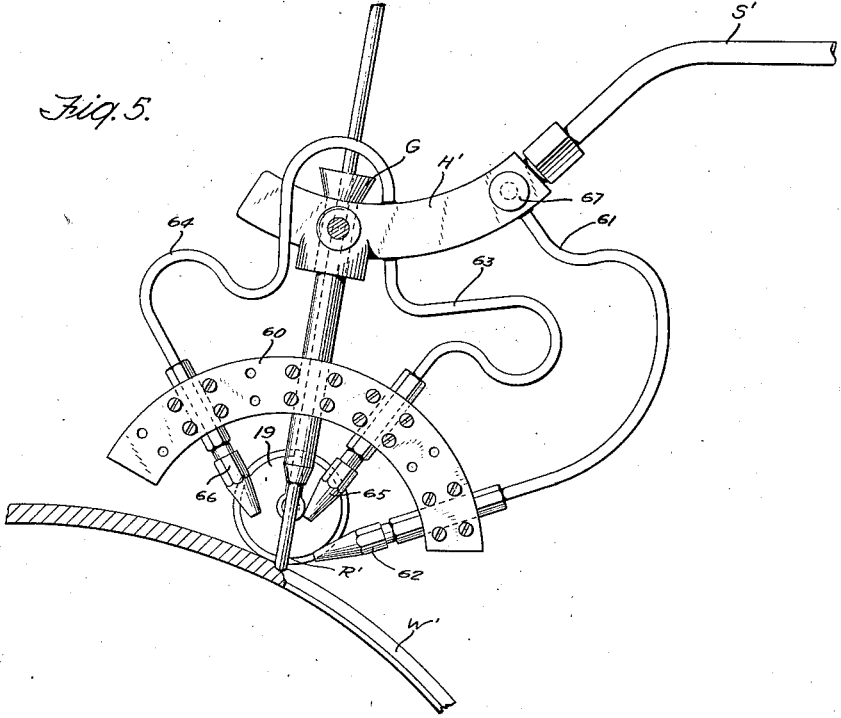
Figs. 5 and 6 are a side elevation and a front elevation respectively of an alternative form of apparatus having flexibly positioned tips.
Figure 6:
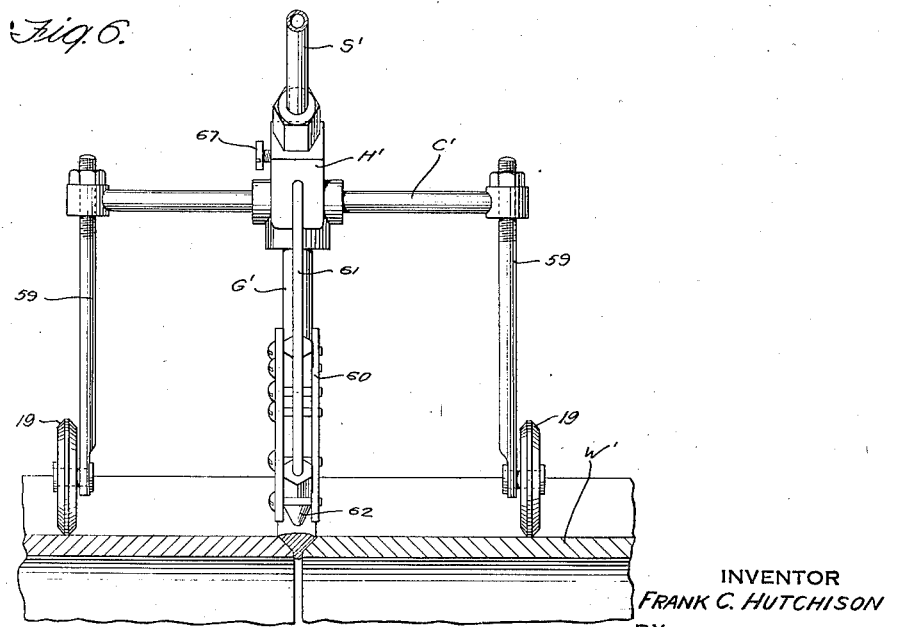

A welding apparatus of the preferred form, as shown in Fig. 1, comprises a gas conducting handle or stem S connected with a welding head H. The welding head may be provided with a welding rod guide G and a carriage C which supports part of the weight of the apparatus on the work W. The welding head has a number of outlet nipples in fixed relation with one another for supporting and conducting gas to a main welding tip 11, a rod preheating tip 12 and an assisting tip 13 respectively. All of the tips are preferably arranged in the same vertical plane and are disposed from the head so as to be directed toward a point P under the rod guide G and near the bottom of a weld V which is cut in the edges of the work W.

The welding head H is made of a hollow casting which may be shaped substantially in the form of a 90° arc of a circle. The radius and length of the arc are of sufficient size so that the tips may be arranged with their respective outlets at desirable distances from the point P. In order to support the welding rod guide G, a bore B is made through the head H between the tips 12 and 13, and, as shown in Fig. 2, a gas passage M in the head is directed to one side of the bore for supplying gas to the rear or assisting tip 13. An annular boss 14 on the casting may serve together with set screws 15 to hold the rod guide G firmly positioned in the bore B. On either side of the head H and adjacent the boss 14 are hubs 16 which may have short recesses for receiving arms 17 of the carriage C. It is preferred to weld or braze the arms to the hubs so that the carriage will be securely jointed to the head H.

The welding rod guide G may comprise a cylindrical member fitting closely within the bore B and extending a short distance below and a relatively great distance above the head H. The internal diameter of the guide is made to receive the largest size of suitable welding rod R, but may be made adjustable in diameter by the addition of an interchangeable sleeve member E or by other mechanical means, if so desired.

The arms 17 of the carriage C are preferably provided with threaded members D near the outer ends thereof so as to retain threaded vertical supporting members 18. The members 18 support short axles which are guided in bearings in the lower end of the supporting members and form mountings for wheels 19 which make the carriage C readily movable upon the surface of the work. The head H may be raised or lowered with respect to the work by adjustment of the supports 18 in the drilled members D at the extremity of the arms 17. Lock nuts 22 are employed to maintain the elevation of the arms in any desired position.

The welding and preheating tips are preferably threadedly secured to outlet nipples which extend radially from the head H. The size and position of these tips may be varied in many different ways so as to develop widely different welding conditions. The angle between the jet from the main welding tip 11 and the tangent to the surface at the welding point may be varied. Preferably the operating angle is maintained within the range of from 0° to 30° and normally at about 15°. The welding flame from the tip or nozzle 11 will impinge upon the edges of the work for a short distance ahead of the welding point P, preheating the metal in prepartion for receiving the applied molten rod material and preventing the same molten material from running ahead into the weld V. The tips 12 and 13 are also directed toward the point P and may be arranged at suitable angles to the welding rod R. The size of the angles between the tips 12 and 13 and the rod is dependent on the rate at which it is desired to preheat the rod and the amount of heat required to assist directly in the formation of the weld. These angles are therefore desirably kept within the limits of 10° to 20° between the rod and each tip.

The tip 11 preferably should be capable of delivering many times the combined volumes of fuel gas delivered by the tips 12 and 13. The flame produced by the jet issuing from the tip 11 may have a short bushy cone so as to prepare thoroughly the weld V, especially in welding relatively thick plates of metal.

When the tips are correctly positioned for the class of work being welded, the main welding flame preheats the entire width and depth of the V and assists in the production and maintenance of a liquid puddle in the lower portion of the V; the middle flame from the tip 12 preheats the forward side of the welding rod and assists in welding the middle zone of the V; and the rear flame from the tip 13 preheats the rear side of the welding rod and welds the top of the V. The rear flame from the tip 13 also tends to prevent the molten weld puddle from chilling too rapidly and thereby prevents the rod from sticking. Since the flame from the rear tip 13 is inclined in a forward direction, the resultant flame produced by the flames from the tips 11, 12, 13 does not envelop the completed weld nor retard solidification of the weld metal. The flame at the same time maintains the puddle liquid for a sufficient length of time to float off the slag and gaseous impurities and thereby assist in eliminating blowholes.

Although the middle tip 12 and the rear tip 13 have been described as rod heating tips, both of these tips in conjunction with the main welding tips 11 also assist in heating the base metal and the puddle of liquid metal within the welding groove since the resultant of the projection of the flames is directed towards the welding point. The flames from the tips 12 and 13 strike the rod and envelop the lower portion of it and at the same time are deflected laterally upon the sides of the welding groove particularly at the top portion thereof as the apparatus is reciprocated to its forward position.

A valve 23 may be mounted in the head for closing off the gas passage leading through the nipple outlet to the tip 13. The valve comprises a valve element 24 which closes a seat 25 in the passage by means of a rotatable stem or handle 26. A suitable lead-wire 27 may be run from the stem 26 through a flexible tubing 28 to a convenient control device or thumb screw 29. By turning the thumb screw 29 the wire 27 rotates within the tubing 28 and moves the valve stem to open or close the valve. The control device 29 is secured to the handle or stem S by a bracket 30.

The valve 23 may be closed or partially closed to decrease the amount of reinforcement of the finished weld. More explicitly, when the size of flame from the tip 13 is decreased by restricting the opening of the passage leading to the tip 13, the amount of metal deposited or melted from the welding rod is likewise decreased, so that a lighter weld results. The operator may change the size of the flame at will by manipulating the control device 29 at the blowpipe handle.

As shown in Figs. 3 and 4 a three-way valve 31 may be employed for reciprocally or inversely controlling the flow of gas to the tip 11 and to the tips 12 and 13 as another means of controlling the gas flames. The valve 31 may comprise a plug-type valve element 32 fitting closely within a valve seat 33 at the junction of the passage from the stem S and coupling 31′ with the gas passage M running lengthwise of the head. The valve element 32 permits gas to flow in both directions in the lengthwise passage of the head to the tip 11 and to the preheating and assisting tips 12 and 13 respectively when the valve is in a normal position. A short lever arm or valve handle 34 connected with the valve element on the exterior of the head may serve to change the position of the valve element 32 so as to decrease the flow of gas to the tip 11 and simultaneously to increase the flow of gas to the tips 12 and 13, or to operate in a reverse manner depending on the condition of the weld V and the movement of the valve handle 34.

A rod 35 pivotally connects the lever arm 34 with a rack 36 situated at a suitable point on the blowpipe handle S. The rack cooperates with a pinion 37 and a thumb control device or quadrant 38 which may be moved in either direction to change the position of the valve 32. A stop 39 may be provided on the handle to indicate a normal position of the valve and of the quadrant with respect to the stop. However by moving the quadrant either way from the normal or centered position the respective main welding flame and the rod preheating flames may be reciprocally or inversely increased or diminished as conditions of the weld V warrant. Other forms of valve controls may be used such as the wire and flexible tubing shown in Fig. 1.

When a tack weld or jammed area is encountered in the V an increase in welding heat from the tip 11 is desirable to melt the tack or deposited metal. At the same time it is advantageous to decrease the effective temperature of the flames issuing from the tips 12 and 13 in order to prevent an excess of metal from melting from the weld rod. By rotating the valve 32 in a clockwise direction as viewed in Fig. 3 the flow of gas to the welding tip 11 is increased and the flow to tips 12 and 13 is decreased and such a condition is brought about. Where the spacing between the edges of the plates or the width of the V is too great, a decrease in the size of the welding flame and an increase in the rate of depositing metal from the weld rod by the tips 12 and 13 will accelerate the speed of welding and prevent the main welding flame from burning through the bottom of the V. Accordingly the valve 32 is rotated in a counter clockwise direction from the normal position to gain the last-mentioned result.

In accordance with this invention a novel method of depositing weld metal has been developed. After the jets are ignited, the carriage is supported on the work so as to center the head in line with the contiguous edges of the metal. The rod guide, and consequently the welding rod, are inclined at an appreciable angle toward the operator to prevent the rod from being occasionally retarded in the weld. As metal is deposited from the rod the blowpipe is moved linearly backward and forward. With normal conditions the blowpipe is moved back and forth along the line of the V for a relatively short distance only. By the forward motion toward the operator the flame from the main tip 11 impinges on the unwelded portion of the V, preheating it slightly. At the same time the rod R is pulled forward until it is nearly on top of the initial line of union between the added weld metal and the base metal so that weld metal is deposited upon this advanced region by the preheating flames from the tips 12 and 13. On the back stroke, the main welding flame is brought to impinge upon the part of the weld previously occupied by the rod and some of the weld metal is swept backward by the velocity of the flame so as to form a part of the weld reinforcement. The cycle is continuously repeated, each time advancing the rod to what might be termed the front end of the weld. By the alternate depositing of metal and sweeping it away a weld is assured which is made up of applied material which penetrates to the bottom of the weld V with no lack of fusion to the side walls.

During the operation the blowpipe handle is held in such a position that the main flame impinges upon the weld V nearly tangentially with the work. Any raising or lowering of the handle will vary the angle at which the flame strikes the work but will cause practically no change in the position of the end of the welding rod. The depositing of metal from the rod therefore continues during the welding operation whether the main welding tip is lifted to concentrate the heat of the flame or lowered to prevent the formation of weld deposit on the under side of the V.

With this novel method of building up a weld in a series of layers running linearly of the weld V, the control of the molten metal by the various flames permits welding of metal pipe and sheet without the use of liners or backing shields and without exact alignment of the edges of the metallic members. The main welding flame may be raised as the V becomes wider in order to concentrate the flame on a smaller area of the V and conversely may be lowered for welding a narrow V.

In addition, with control of the rear preheating or assisting flame the rate of deposition of weld material may be decreased in narrow portions of the V and speeded up where the V is wider. Or with the alternative form of reciprocal controlling valve 31 the main flame may be increased in intensity at the narrow points in the V as both of the preheating flames are made to decrease their effective temperature.

The puddle behind the welding rod resulting from the use of the tip 13 is agitated by the back and forth movement of the blowpipe so that slag and gas are driven off, preventing the formation of blowholes. However heat is not unduly held in the weld puddle, because the main welding flame is split into two branches by the preheating flames and passes to either side of the weld.

It will be appreciated from the foregoing description that with a single setting or elevation of the welding head H, as determined by the position of the supporting members 18 with respect to the arms of the carriage C, seams between a reasonably large number of different plate thicknesses may be welded in which the curvature of said seams in the vertical plane may vary from a straight line, as in the case of flat plates, to curvatures having a relatively small radius. The flexible character of the apparatus is made possible by the regulation of the angle at which the main welding flame may be directed against the work and by the valve control of the size of the flames. It becomes unnecessary for the operator to make an adjustment of the height of the welding head for every new piece of work.

Where greater flexibility is desired an alternative form of apparatus, as shown in Fig. 5, may comprise a welding head H' and a number of flexible welding and preheating tips connected with the head by lengths of tubing. The head H' is supplied with a gaseous mixture from a stem S' and is supported above the work W' by a carriage C' which is adjustable in height. A welding rod guide G' is secured to the head H', and is preferably held in the same plane as the supports 59 of the carriage.

The welding rod guide G' holds a bracket 60 positioned below the head H'. The bracket 60 may comprise a pair of semi-circular plates of metal spaced from one another by the guide G' and secured thereto as by machine screws or bolts which also make rigid connections between the plates. A number of holes are drilled at frequent intervals through both of the plates of the bracket so that bolts may be inserted at convenient points to hold the welding and preheating tips, while permitting longitudinal adjustment of the tips.

A conduit 61 extends from the front of the head H' to a straight welding tip 62 to which it is securely soldered. The conduit 61 may be bent arcuately in order to locate the main welding tip 62 in any position which is desired between the plates of the bracket 60, where the tip is firmly clamped by means of bolts which draw the plates toward one another to bear tightly against the tip. Similar conduits 63 and 64 are led from points toward the rear of the head H to tips 65 and 66 respectively. The tips 65 and 66 are also clamped between the plates of the bracket 60 and are positioned on either side of the welding rod R' for preheating the end of the rod and for assisting in the function of welding.

The angular position of the tips with respect to the work, and the distance of the tip outlets from the end of the welding rod R' may be varied to suit the character of the work. As an example, in the welding of relatively heavy plate, it is desirable to direct the tips 65 and 66 toward a point under the welding rod and slightly below the surface of the work, while the main welding tip 62 is preferably directed toward a point at the bottom of the weld V. The position of the tips 65 and 66 may also be adjusted with respect to the rod R' to change the rate of deposition of applied metal in accordance with the strength of weld that is desired.

A valve 67 similar to valve 31 previously described may be employed on the head H' between the outlet to the conduit 61 leading to the main tip and the outlets to the conduits 63 and 64. When a welding operation is in progress, the valve 67 may be closed sufficiently to decrease the size of the flames from both the tips 65 and 66 when a narrow place in the weld V is approached in order to decrease the amount of metal deposited from the welding rod. The volume of gas flowing to the main tip 62 is varied inversely with changes made in the size of the rod preheating flames, when the valve 67 is operated, thereby reducing or increasing the heat delivered by the welding flame as conditions of the weld V make such a change desirable.

Although more than one embodiment of this invention has been described and illustrated it will be understood that other changes may be made without departing from the scope of this invention.

I claim:—

1. A manually operable apparatus for use in welding two members together along a seam, said apparatus comprising structure including a guide for directing a welding rod into the welding region; heating means secured to said guide in position to direct welding heat upon said region; a second heating means secured to said guide to direct heat upon the front side of the welding rod above the welding region; a third heating means also secured to said guide to direct heat on the rod behind and above the welding region; and means for supporting said structure so that it is movable backward and forward along said seam.

2. A manually operable apparatus for use in welding two members together along a seam, said apparatus comprising structure including a guide for progressively feeding a welding rod into the welding region; heating means secured to said guide in position to direct welding heat to a point adjacent the bottom of said seam and below the end of the welding rod; a second heating means secured to said guide to direct heat upon the front side of the welding rod and toward said point adjacent the bottom of the seam; a third means also secured to said guide to direct heat on the rear side of the rod and toward the point in the seam; and means for supporting said structure so that it is movable backward and forward along said seam.

3. In apparatus for use in welding two members together along a seam, the combination of structure including a guide for directing a welding rod to a welding point; a head for supplying a combustible gas both in front of and behind said guide; a tip secured to said head for directing a welding jet along the bottom of the seam at a small angle to the tangent thereto at the welding point; a second tip secured to said head for directing a preheating jet along the front side of the rod to said welding point; a third tip also secured to said head for directing a preheating jet along the rear of the rod to the welding point; a carriage for supporting said structure above the seam; and means for raising and lowering said head and said tips on said carriage.

4. In apparatus for use in welding two members together along a seam; the combination of structure including a guide for directing a welding rod to a welding point; an arcuate head for supplying a combustible gas and supporting said rod guide; a front tip secured to said head for directing a welding jet along the seam at a small angle to the tangent thereto at the welding point; a middle tip extending from said head for directing a preheating jet along the front side of the welding rod; a rear tip also extending from said head from behind said rod guide for directing an additional preheating jet along the welding rod; a carriage for supporting said structure above the seam; and means for raising and lowering said head and said tips on said carriage.

5. In apparatus of the class described; the combination of a guide for directing a welding rod into a welding region; means secured to said guide adapted to direct welding heat upon said region; separate preheating means also secured to said guide to direct heat angularly upon the welding rod a relatively short distance above the welding region; and means for regulating the degree of heat supplied by said separate preheating means independently of said first heating means.

6. In apparatus of the class described; the combination of a guide for directing a welding rod to a welding point; means secured to said guide adapted to direct welding heat to the welding point; preheating means secured to said guide to direct heat upon the forward side of the welding rod and toward the welding point; additional preheating means also secured to said guide to direct heat against the rear of the rod toward the welding point; and means including a valve for independently regulating the degree of heat supplied by said additional preheating means.

7. In apparatus of the class described; the combination of a guide for directing a welding rod to a welding point; a head having passages to supply combustible gases; a tip secured to said head for directing a gaseous welding jet to a welding point; a plurality of preheating tips also secured to said head for directing gaseous heating jets against the welding rod; and means for reciprocally controlling the flow of gas to said welding tip and to said preheating tips.

8. In apparatus of the class described; the combination of a guide for directing a welding rod to a welding point; a head having passages to supply combustible gas; a tip secured to said head for directing a welding jet to the welding point; a plurality of preheating tips also secured to said head for directing jets against the welding rod and to the welding point; and means cooperating with said passages for changing the size of the welding jet simultaneously with an opposite change in the sizes of the preheating jets.

9. A manually operable apparatus for use in welding two members together along a seam, said apparatus comprising structure including a guide for directing a welding rod into the welding region; heating means adjustably connected with said guide to direct welding heat upon said region; a second heating means adjustably connected with said guide to direct heat upon the front side of the welding rod; a third heating means also adjustably connected with said guide to direct heat on the rod behind and above the welding region; and means supporting said structure, such supporting means being movable backward and forward along said seam during a welding operation.

10. A manually operable apparatus for use in welding two members together along a seam, said apparatus comprising structure including a guide for directing a welding rod into the welding region; a gas conducting means secured to said guide; means adjustably connected with said guide to direct welding heat upon said region; means adjustably connected with said guide to direct heat upon the welding rod; a member for clamping said welding means and said rod heating means in selected angular position; and means for supporting said structure, such supporting means being movable backward and forward along the seam during a welding operation.

11. A manually operable apparatus for use in welding two members together along a seam, said apparatus comprising structure including a guide for directing a welding rod into a welding region; a gas conducting means secured to said guide; a tip adjustably connected with said guide to direct welding heat upon said region; a plurality of tips adjustably connected with said guide to direct heat upon the welding rod; means for securing said welding tip and said rod heating tips in any desired position; a valve associated with said gas-conducting means to regulate the delivery of gas to said welding tip and adapted to deliver amounts of gas to said rod heating tips varying inversely to the amount of gas delivered to said welding tip; and means for supporting said structure, such supporting means being movable backward and forward along the seam during a welding operation.

12. In apparatus of the class described the combination of means for directing a welding rod to a welding point; a gas conducting head; means adjustably connected with said head for directing welding heat to the welding point on the work; means adjustably connected with said head for directing heat to the welding rod; a member connecting all of said means in angular relation; and means whereby the angularity of said welding means and said welding rod heating means is adjustable with respect to the work and whereby the position of both said aforementioned means is adjustable with respect to the welding point.

13. Welding apparatus comprising the combination of means for guiding a welding rod to a welding point; and means, angularly disposed relatively to the axis of such guiding means, for directing separate heating flames against opposite sides of the welding rod.

14. Welding apparatus comprising the combination of means for guiding a welding rod to a welding point; and means, including two nozzles disposed angularly relatively to the axis of said guiding means, for directing two heating flames against opposite sides of the welding rod; the angular relation of said nozzles relative to the axis of said guiding means being such that said heating flames are deflected downwardly along the welding rod to the welding point.

15. Welding apparatus comprising the combination of means for guiding a welding rod to a welding point; means, angularly disposed relatively to the axis of such guiding means, for directing separate heating flames against opposite sides of the welding rod; and means for directing a third heating jet onto the welding point.

16. A welding apparatus comprising means for directing a heating flame against the rear side of a welding rod in a forwardly and downwardly inclined direction; means for directing a heating flame against the forward side of the rod in a rearwardly and downwardly inclined direction; said flames striking said rod and being deflected thereby to the welding point; and means for directing a heating flame in a rearward direction upon the welding point, the vertical angle between said last-mentioned heating flame and the tangent to the work at said point being within 30° and lying above said tangent.

17. A welding apparatus comprising means for directing a heating flame on the rear side of a welding rod in a forwardly and downwardly inclined direction; means for directing a heating flame on the forward side of the rod in a rearwardly and downwardly inclined direction; said flames striking said rod and being deflected thereby to the welding point; and means for directing a heating flame in a rearward direction upon the welding point, the vertical angle between said last mentioned heating flame and the tangent to the work at said point being about 15° and lying above said tangent.

18. The method of welding comprising fusing the surfaces to be welded and fusing the end of a welding rod to produce a liquid puddle of weld metal upon said surfaces; said fusing operations comprising directing a forwardly and downwardly inclined heating flame on the rear side of the welding rod above its end; directing a rearwardly and downwardly inclined heating flame upon the forward side of the welding rod above its end; and directing a larger flame than the other two rearwardly and downwardly upon the welding point at a small vertical angle to the tangent to the work at the welding point.

19. The process of welding contiguous metal edges which comprises normally maintaining a welding rod, a high temperature welding jet and rod preheating jets in fixed angular relation with said preheating jets being directed against opposite sides of the welding rod; moving said rod and said welding and preheating jets lengthwise of the metal edges while feeding the welding rod to such edges; and controlling the fusion of the metal by the aforesaid welding jet and rod preheating jets during such movement by directing said rod and both said jets linearly backward and forward along the seam being welded during the welding operation.

20. The process of welding contiguous metal edges which comprises normally maintaining a welding rod, a high temperature welding jet and rod preheating jets in fixed relation; moving said rod and said welding and rod preheating jets lengthwise of the metal edges while feeding the welding rod to such edges; controlling the fusion of the metal by the aforesaid welding jet and rod preheating jets during such movement by directing said jets linearly back and forth relative to the edges of the metal; and varying the temperature of the rod preheating jets to regulate the amount of metal deposited from the welding rod in accordance with variations in space between the said metal edges.

21. The process of welding contiguous metal edges which comprises maintaining a welding rod, a high temperature welding jet and rod preheating jets in fixed relation; moving said rod and said welding jet and rod preheating jets lengthwise of the metal edges; and controlling the fusion of the metal by directing said jets linearly back and forth and by reciprocally varying the temperature applied by the rod preheating jet and the temperature applied by the welding jet whereby different amounts of welding rod material are deposited in accordance with changes in width between the contiguous metal edges.

22. Manually operable welding apparatus comprising a vertically-disposed arcuate welding head and means for supporting the same for movement longitudinally of a seam to be welded, a welding rod guide carried by the said head, a plurality of angularly-spaced nozzles connected with the head in the same general vertical plane longitudinally of the seam, at least one of the said nozzles being disposed at a small angle with respect to the work and directed toward a point thereon near the end of the welding rod to provide a welding zone, and two of the said nozzles being directed angularly upon opposite sides of the welding rod above the said welding zone.

23. Apparatus as defined in claim 22, together with means for controlling the flow of gas to the two last-named nozzles independently of the gas flow to the other-named nozzle.

24. Process of welding in which combustible gas is supplied to a welding nozzle and a welding rod preheating nozzle normally maintained in fixed relation to a welding rod adapted to be fed automatically by gravity toward the contiguous metal edges of the work, which consists in moving the welding rod and said nozzles relative to the work and, during such relative movement, simultaneously regulating the rate of flow of combustible gas supplied to said welding nozzle inversely to the rate of flow of combustible gas supplied to said welding rod preheating nozzle so as to control the size of the flame produced by the welding nozzle and to control the rate at which the welding rod material is fused by the welding rod preheating nozzle.

25. In welding apparatus for progressively welding a seam in work, the combination of means for directing a welding rod toward the welding point, means for directing at least one gaseous jet toward the welding point to preheat the welding rod, and independent means adjustable with respect to said welding rod preheating means for directing a gaseous jet along the seam from an unwelded portion thereof toward the advancing edge of the molten metal forming the welding point for preheating the seam ahead of the welding point and for applying heat at the welding point, said last-mentioned gaseous jet having sufficient velocity to prevent molten metal at the welding point from freely flowing forward in the seam.

26. Apparatus for welding a seam in work, comprising a blowpipe for supplying combustible gas, said blowpipe including a welding head having a gas passage therein, and a tip having a gas passage communicating with the gas passage in said welding head, said tip being positioned during welding at a vertical angle of about 30° or less to the tangent to the work surface and operative to deliver a gaseous jet against the advancing edge of the molten metal forming a welding region in the seam.

27. In apparatus for welding a seam in work, the combination of means for guiding a welding rod to a welding region, means adjustable with respect to said guiding means for providing welding heat at such region, and means positioned ahead of the welding region for applying a gaseous jet rearwardly upon the advancing edge of the molten metal forming the welding region, said gaseous jet having sufficient force to prevent the molten metal from flowing forward in the seam.

28. In apparatus for welding a seam in work, the combination of means for providing welding heat at a welding region, jet means positioned during welding at an acute angle of 30° or less with respect to the tangent to the same for directing a gaseous blast rearwardly upon the advancing edge of molten metal forming the welding region in the seam, and means for directing a welding rod into the welding region at a point rearwardly of the point at which said gaseous blast is applied on the work.

29. In apparatus for welding a seam in work, the combination of a welding nozzle having a gas passage for directing a welding jet upon the welding region, a guide for directing a welding rod toward said region, a nozzle having a gas passage for directing a preheating jet upon said welding rod, means including a distributing head connecting said rod guide and said nozzles and having a gas passage therethrough communicating with the passages of said nozzles, and valve means in said distributing head gas passage for controlling the flow of gas to said nozzles.

30. Welding apparatus in which a welding rod is fused and deposited at a welding point in a seam to be welded, comprising the combination of means for preheating a welding rod as it is fed to the welding point; means for guiding the welding rod; additional means for preheating the welding rod as it is fed to the welding point; and means for applying a welding flame on the welding point; said first-mentioned preheating means, guiding means, additional preheating means, and welding flame-applying means being arranged successively in the order named.

31. Apparatus according to claim 30, in which said welding flame-applying means is so positioned and arranged that the welding flame is applied at a slight angle to the work surface from an unwelded portion of the seam toward the welded portion thereof.

32. Welding apparatus according to claim 30, including means for supporting at least part of the weight of the apparatus on the work.

33. Welding apparatus in which a welding rod is fused and deposited at a welding point in a seam to be welded, comprising the combination of means for applying a gaseous jet on the welding rod as it is fed to the welding point; means for guiding the welding rod; additional means for applying another gaseous jet on the welding rod as it is fed to the welding point; means for applying a welding jet on the welding point; said first-mentioned jet-applying means, guiding means, additional jet-applying means, and welding jet-applying means being arranged successively in the order named; and a single means for simultaneously controlling the quantity of gas delivered to both of said welding rod jet-applying means and said welding jet-applying means.

34. Apparatus according to claim 33, in which said welding jet-applying means is so positioned and arranged that the welding jet is applied along the seam at a slight angle to the work surface and toward the front part of the welding point.

35. Welding apparatus according to claim 33, including means for supporting at least part of the weight of the apparatus on the work.

36. A blowpipe comprising a head; a welding rod guide secured to said head; a main welding and work preheat nozzle having a main welding orifice extending rearwardly towards the welding region and at an acute angle to the tangent to the work at the welding region; and an arcuate conduit connecting said nozzle with said head.

37. A blowpipe for welding a seam between metallic bodies including, in combination, a welding head having a passage therethrough; a tip; and a member having a passage connecting said welding head and said tip and having an arcuate portion of comparatively wide sweep in the vertical plane of the seam during welding.

FRANK C. HUTCHISON.